United States Patent [19]
Agrawal et al.

[11] Patent Number: 5,530,912
[45] Date of Patent: Jun. 25, 1996

[54] TRAFFIC DRIVEN CHANNEL RESERVATION SYSTEM FOR HANDOVERS IN CELLULAR NETWORKS

[75] Inventors: Prathima Agrawal, New Providence; Dinesh K. Anvekar, North Plainfield; Balakrishnan Narendran, New Providence, all of N.J.

[73] Assignee: AT&T Corp., Murray Hill, N.J.

[21] Appl. No.: 268,135

[22] Filed: Jun. 29, 1994

[51] Int. Cl.$^6$ .................................................. H04M 11/00
[52] U.S. Cl. ........................... 455/33.2; 455/56.1; 379/60
[58] Field of Search ................................ 455/33.2, 33.3, 455/33.4, 56.1; 379/60

[56] References Cited

U.S. PATENT DOCUMENTS

| | | |
|---|---|---|
| 5,081,671 | 1/1992 | Raith et al. . |
| 5,146,609 | 9/1992 | Tayloe et al. . |
| 5,150,362 | 9/1992 | Akerberg . |
| 5,189,734 | 2/1993 | Bailey et al. . |
| 5,241,685 | 8/1993 | Bodin et al. .......................... 455/33.2 |
| 5,265,263 | 11/1993 | Ramsdale et al. . |
| 5,276,906 | 1/1994 | Felix ...................................... 455/33.2 |
| 5,278,991 | 1/1994 | Ramsdale et al. . |
| 5,289,525 | 2/1994 | Issenmann et al. . |
| 5,301,356 | 5/1994 | Bodin et al. .......................... 455/33.2 |

OTHER PUBLICATIONS

S. Tekinay and B. Jabbari, "Handover and Channel Assignment in Mobile Cellular Networks," IEEE Commun. Mag., vol. 29, No. 11, Nov. 1991.

S. Tekinay and B. Jabbari, "A Measurement–Based Prioritization Scheme for Handovers in Mobile Cellular Networks," IEEE J. Select. Area Commun., vol. 10, No. 8, Oct. 1992.

S. Tekinay and B. Jabbari, "Analysis of Measurement Based Prioritization Schemes For Handovers in Cellular Networks," Proceedings of Globecom '92 Conference.

W. R. Mende, "Evaluation of a Proposed Handover Algorithm for the GSM Cellular System," Proceedings of the IEEE Vehicular Technology Conference, pp. 264–269, May 1990.

H. Panzer and R. Beck, "Adaptive Resource Allocation in Metropolitan Area Cellular Mobile Radio Systems," Proceedings of the IEEE Vehicular Technology Conference, pp. 683–645, May 1990.

*Primary Examiner*—Andrew I. Faile

[57] ABSTRACT

A method is disclosed for reducing handover failure probability in cellular networks which includes the steps of determining whether a mobile subscriber is traversing a pre-handover zone defined in each cell of the network, reserving a free channel in an adjacent cell for the mobile subscriber traversing the pre-handover zone, and granting the free channel to the mobile subscriber upon entering a handover region extending across the boundary of the adjacent cells provided that a free channel is available at such a time, and in the alternative, if a free channel is not available at such a time, the handover request is queued until a free channel becomes available.

15 Claims, 5 Drawing Sheets

TRAFFIC DRIVEN CHANNEL RESERVATION SYSTEM FOR HANDOVERS IN CELLULAR NETWORKS

BACKGROUND OF THE INVENTION

1. Field of the Invention

The subject invention relates to mobile cellular networks, and more particularly, to a method for allocating channels to mobile subscribers traveling through a handover region extending across the boundary of adjacent cells of a cellular network.

2. Description of the Related Art

A mobile cellular network is a radio system which provides radio communication for mobile subscribers over a large geographical area. Cellular networks generally consist of a plurality of base stations arranged in a systematic pattern throughout a geographical area to define a plurality of adjoining cells of between 2 and 20 kilometers in radius.

Typically, a mobile subscriber equipped with a mobile radio unit in a particular cell communicates through a radio channel provided by the base station of that cell. When a mobile subscriber is traveling between adjacent cells of a network, a handover must be performed whereby the mobile subscriber terminates communication with the base station of one cell and initiates communication with the base station of another cell. A handover may be blocked however, if a free channel is not available within the target cell, resulting in the disruption of service to the mobile subscriber. The probability of handover failure, typically described by the forced termination of calls, is a major factor in evaluating the performance of a cellular system.

Techniques for minimizing or reducing handover disruptions have been described in the prior art and include both non-reservation based and reservation based handover systems. In non-reservation based systems, handover requests are prioritized based upon a queuing scheme, such as, for example, a first-in-first-out scheme. In such a system, a new call originating within the target cell will not be granted a channel until all of the handover requests in the queue are served.

In reservation based systems, a fixed or dynamically adjustable number of free channels may be reserved in each cell of a network for handover requests. For example, U.S. Pat. No. 5,081,671 to Raith et al. describes a system for reducing handover interruptions by allocating a predetermined number of reserve channels in each cell of a network for the handover requests of mobile subscribers. However, in such a system, free channels reserved for handovers may go unutilized due to a lower than expected number of handover requests. Thus, the total carried traffic will be reduced even when free channels are in existence.

Another method for reducing handover disruption is described in U.S. Pat. No. 5,189,734 to Bailey et al. which includes the steps of forming a subset of cells adjacent the cell within which a mobile subscriber is traveling and requesting the base stations in each of these cells to reserve a channel in the event of a handover to one of the base stations. In such a system, free channels reserved for handover requests in a plurality of cells will go unutilized for a period of time while the mobile subscriber is traveling within the current cell, thereby reducing the overall efficiency of the cellular network.

Clearly, a need exists for an improved reservation based system which reduces the probability of handover failure in a mobile cellular network without significantly increasing call blocking probability and decreasing overall carried traffic.

SUMMARY OF THE INVENTION

The subject invention is directed to a method for reducing handover failure probability in mobile cellular networks. In accordance with a preferred embodiment of the subject invention, the method allocates channels to mobile subscribers entering a handover region extending across the boundary of first and second adjacent cells of a cellular network. Pre-handover zones are defined in each of the cells of the network proximate the associated handover region within which free channels are reserved for mobile subscribers traveling therethrough.

The method comprises the steps of determining whether a mobile subscriber is traversing the pre-handover zone of a first cell, reserving a channel in a second cell for the mobile subscriber traversing the pre-handover zone in the first cell, and granting the channel reserved in the second cell to the mobile subscriber upon entering the handover region.

Preferably, the method further comprises the step of queuing the channel requests of mobile subscribers entering the handover region if a free channel is not available in the second cell at such a time. The step of queuing channel requests preferably comprises ordering the channel requests of each of the mobile subscribers travelling within the handover region in dependence upon the measured power signal associated with each of the mobile subscribers.

The method of the subject invention further comprises the step of granting a free channel within the second cell to a new call initiated therein provided that there are no mobile subscribers traveling within the handover region awaiting a free channel in the second cell, and the number of free channels in the second cell is greater than the number of mobile subscribers traversing the pre-handover zone in the first cell.

Further features of the method of the subject invention will become more readily apparent to those skilled in the art to which the subject invention appertains from the following detailed description of the preferred embodiments taken in conjunction with the drawings.

BRIEF DESCRIPTION OF THE DRAWINGS

So that one skilled in the art to which the subject invention appertains will better understand how to practice the method of the present invention, preferred embodiments of the method will be described in detail hereinbelow with reference to the drawings wherein.

DETAILED DESCRIPTION OF THE PREFERRED EMBODIMENTS

Figure 1:
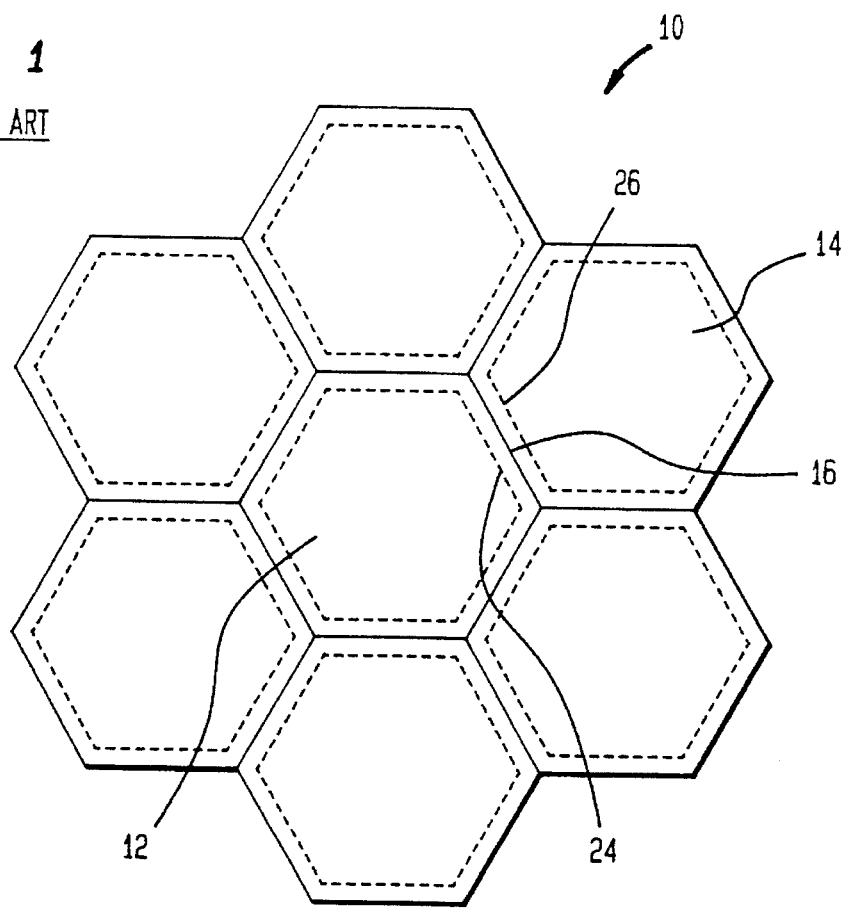
FIG. 1 is a schematic illustration of a prior art cellular network consisting of a plurality of adjoining cells.
Figure 2:
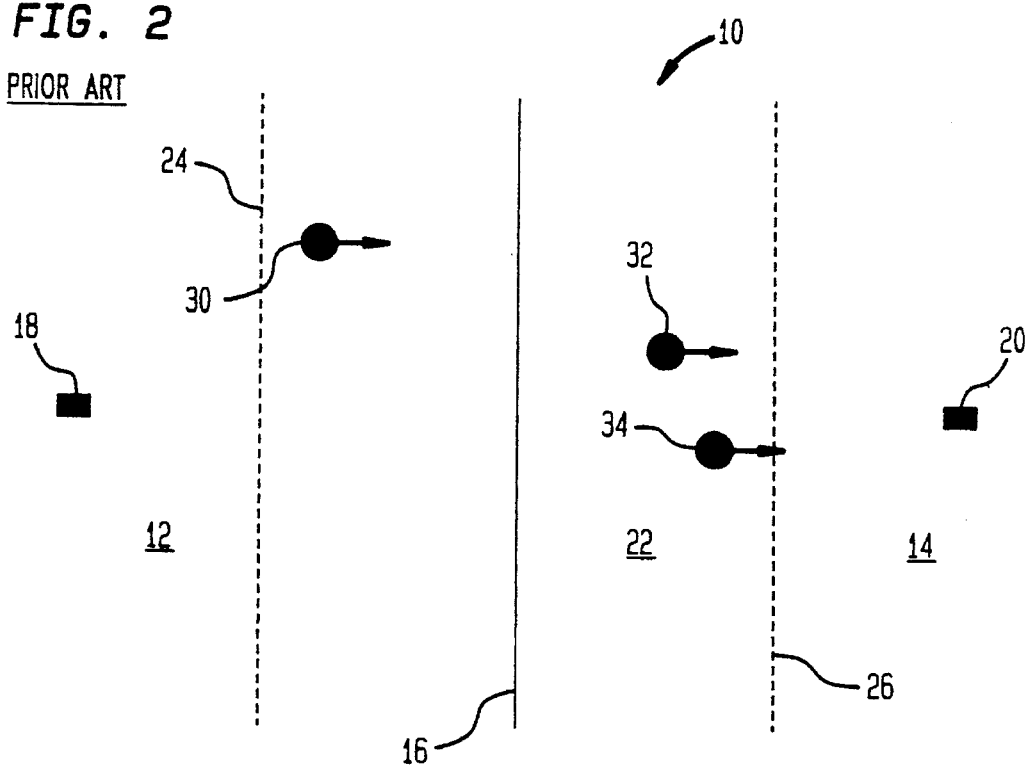
FIG. 2 is an enlarged schematic illustration of two adjacent cells of the prior art cellular network illustrated in FIG. 1 wherein a handover region extends across the boundary of the two adjacent cells.

Referring now to the drawings, there is illustrated in FIG. 1 a prior art cellular radio network 10 having a plurality of adjoining cells including adjacent cells 12 and 14 which are separated by a boundary 16. As best seen in FIG. 2, a first base station 18 is located within cell 12 and a second base station 20 is located within cell 14. A handover region 22 extends across boundary 16 and is defined by a first boundary line 24 within cell 12 and a second boundary line 26 within cell 14. For purposes of illustration, three mobile subscribers indicated by reference numerals 30, 32, and 34, are located within handover region 22, and, as shown by their respective directional indicator arrows, are traveling in the direction of the second cell 14, the target cell.

In the prior art cellular radio network 10 illustrated in FIG. 2, boundary line 24 defines the point where the power received from base station 20 by a mobile subscriber traveling toward target cell 14 is sufficient enough to enable reliable radio communication. When a mobile subscriber crosses boundary line 24, it can communicate with either of the base stations. At such a time, a mobile subscriber's call can be handed over from one cell to another.

As mobile subscribers 30, 32, and 34 traverse handover region 22, traveling toward target cell 14, the power they receive from base station 18 decreases while the power they receive from base station 20 increases. When a mobile subscriber crosses boundary line 26, it can no longer be served by base station 18 and, unless the call has been transferred (handed over), it will be terminated. Thus, to achieve a successful handover, a call must be transferred within the period of time during which a mobile subscriber is moving through handover region 22.

Figure 3:
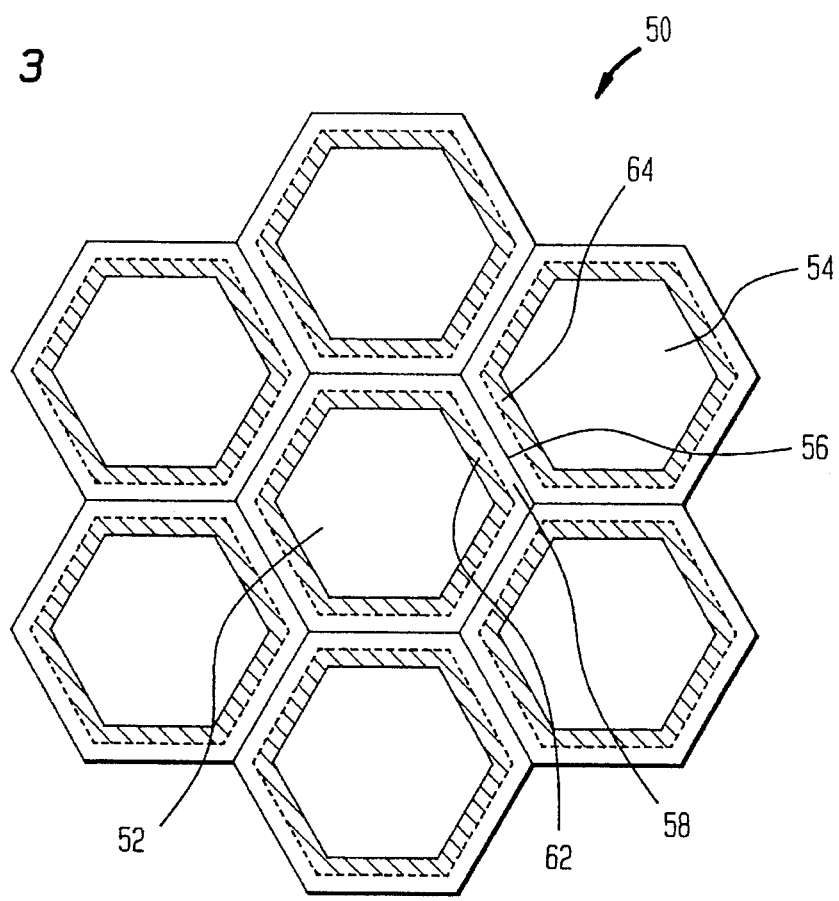
FIG. 3 is a schematic illustration of a cellular network arranged in accordance with a preferred embodiment of the subject invention.
Figure 4:
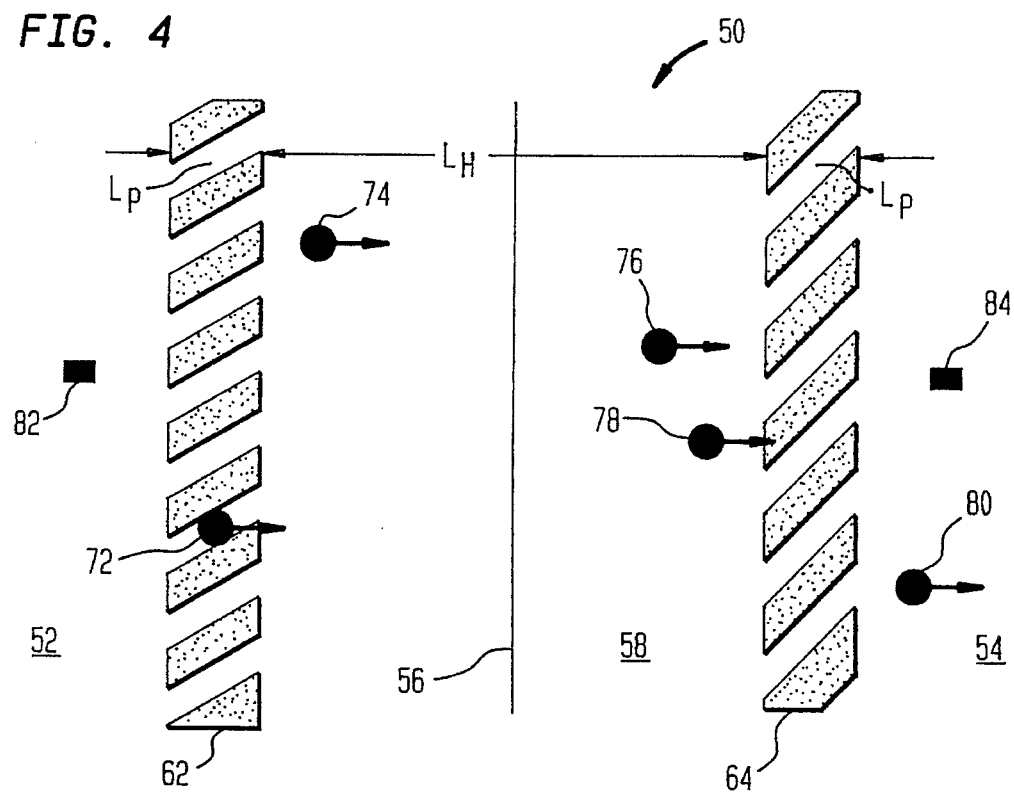
FIG. 4 is an enlarged schematic illustration of two adjacent cells of the cellular network illustrated in FIG. 3 wherein pre-handover zones are defined in each of the adjacent cells proximate the handover region extending across the boundary of the two cells.

Referring to FIG. 3, there is illustrated a cellular network 50 arranged in accordance with a preferred embodiment of the subject invention. Cellular network 50 has a plurality of adjoining cells including adjacent cells 52 and 54 which are separated by a boundary 56. As best seen in FIG. 4, a handover region 58 extends across boundary 56 and defines the area within which on-going calls can be successfully transferred between cells 52 and 54.

Referring to FIG. 4, a pre-handover zone is defined within each of the cells of cellular network 50 within which channels are reserved in an adjacent cell for mobile subscribers traveling therethrough. More specifically, a pre-handover zone 62 is defined within cell 52 proximate handover region 58 within which channels are reserved in cell 54 for a mobile subscriber traveling toward cell 54. Similarly, a pre-handover zone 64 is defined within cell 54 proximate handover region 58 within which channels are reserved in cell 52 for a mobile subscriber traveling toward cell 52. The pre-handover zones permit mobile subscribers to hold two channels simultaneously for the time period within which they are traversing the pre-handover zone.

The width $L_p$ of the pre-handover zone in each cell is substantially less than the width $L_h$ of the handover region. Therefore, the two channels are simultaneously held for only a short period of time, and the effect upon channel resources is minimal. As a result, overall system efficiency is not impaired.

The channel reservation system of the subject invention employs a queuing scheme for ordering handover requests of mobile subscribers traveling through handover region 58 when channels are unavailable in the target cell. Preferably, a measurement-based prioritization scheme (MBPS) is employed, wherein handover requests are prioritized by the power level that a mobile subscriber receives from the base station of a current cell. This queuing scheme is described in an article entitled *"A Measurement-Based Prioritization Scheme for Handovers in Mobile Cellular Networks,"* IEEE J. Select. Areas Commun., Vol. 10, No. 8, October 1992, which is herein incorporated by reference. In this queuing scheme, the power levels associated with each mobile subscriber in the handover region are periodically monitored, and the mobile subscribers waiting in the handover queue are periodically sorted in accordance with their priorities. A mobile subscriber waiting for an available channel will gain priority as its power measurement decreases. When a channel becomes available within the target cell, it is granted to the mobile subscriber with the highest priority i.e., the lowest power measurement. Those skilled in the art will appreciate that alternative queuing schemes may be employed in the channel reservation system of the subject invention for ordering handover requests of mobile subscribers traveling through a handover region.

Referring to FIG. 4, the manner in which channels are allocated within cellular network 50 is described below. Five mobile subscribers 72, 74, 76, 78 and 80 are illustrated and are traveling within cellular network 50. Initially, the base station 82 located within cell 52 determines whether a mobile subscriber is traveling within pre-handover zone 62 based upon the radio power measurement transmitted by the mobile subscriber. If it is determined that a mobile subscriber is within pre-handover zone 62, i.e. mobile subscriber 72, a channel is reserved within cell 54 for that mobile subscriber. At such a time, mobile subscriber 72 holds two channels simultaneously, one channel in-use in cell 52 and the other channel in reserve in cell 54.

When mobile subscriber 72 leaves pre-handover zone 62 and enters handover region 58, the reserved channel in cell 54 will be granted to mobile subscriber 72 and the call will be successfully handed over. However, if there are no channels available within cell 54 at such a time, the handover request of mobile subscriber 72 will be queued along with the handover request of the other mobile subscribers travelling within handover region 58, namely mobile subscribers 74, 76, and 78. Once in the queue, the channel requests of mobile subscribers 72, 74, 76, and 78 can be ordered in dependence upon their respective power measurements. In FIG. 4, mobile subscriber 78 will have the highest priority even if it entered the queue later than any of the other mobile subscribers by initiating a later channel request. This measurement-based prioritization scheme will reduce the probability of handover failure in cellular network 50.

Figure 5:
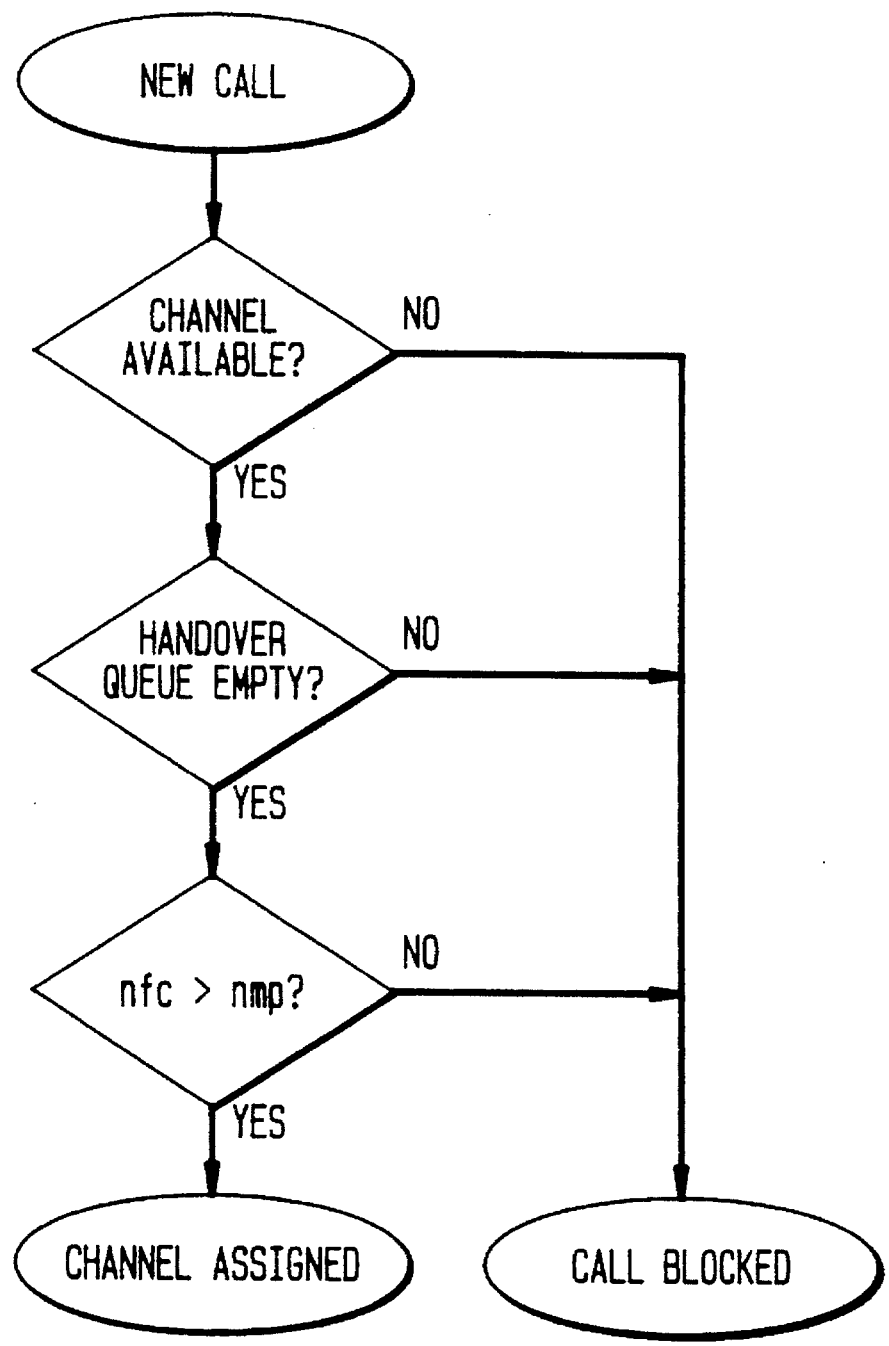
FIG. 5 is a flow chart which represents the method for assigning a channel to a new call initiated within the target cell of a cellular network arranged in accordance with a preferred embodiment of the subject invention.

In the handover system of the subject invention, channels are allocated to new calls initiated within a target cell as per the method indicated in FIG. 5. Referring to FIG. 4 in conjunction with the flow chart illustrated in FIG. 5, when a new call is made within target cell 54 by a mobile subscriber travelling therein, i.e. mobile subscriber 80, a free channel will be allocated to the call if there are no mobile subscribers traveling within handover region 58 who are awaiting a free channel, and the number of free channels (nfc) in cell 54 is greater than the number of mobile subscribers (nmp) traversing pre-handover zone 62. The number of mobile subscribers in the pre-handover zones are periodically determined by base stations 82 and 84 of each cell, respectively, and are communicated therebetween.

In accordance with the prioritization scheme of the subject invention, if a new call is initiated within cell 54, and there are no free channels available therein, or if there are handover requests remaining in the handover queue, the new call will be blocked. In addition, a new call will be blocked if the number of free channels in target cell 54 is less than the number of mobile subscribers traversing the pre-handover zone 62 in cell 52. Thus, the handover system of the subject invention allocates channels based upon the volume of traffic traveling through the pre-handover zones. This "look-ahead" channel reservation system achieves a significant reduction in handover failure probability as compared to "no look-ahead" channel reservation systems characteristic of the prior art.

Figure 6:
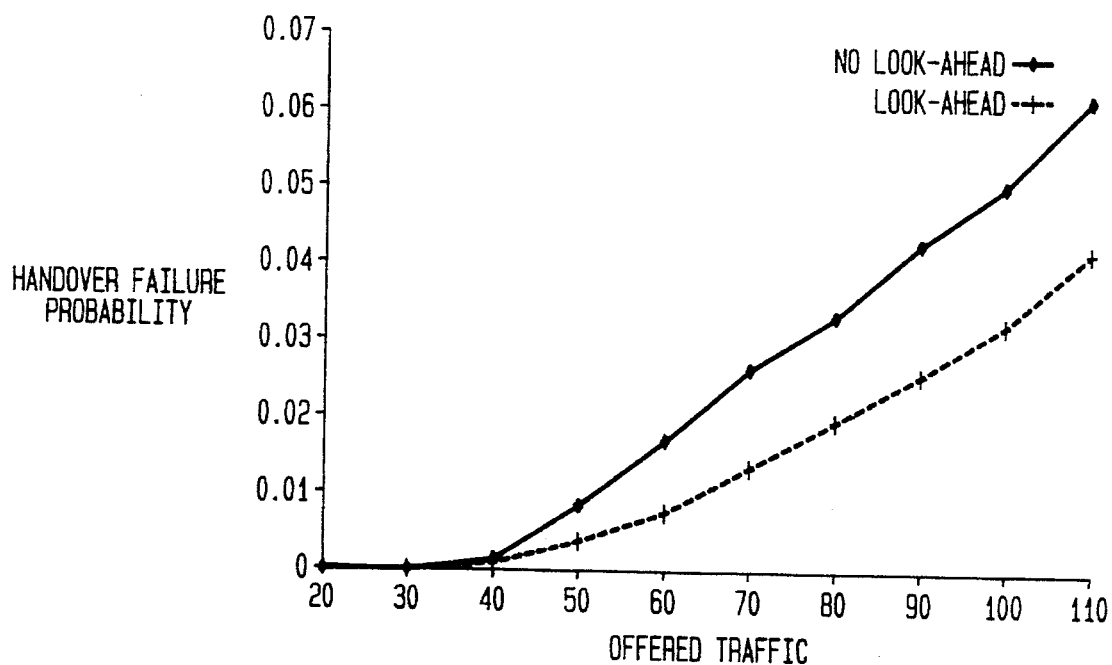
FIG. 6 is a graphical representation of offered traffic versus handover failure probability for two different channel reservation systems.
Figure 7:
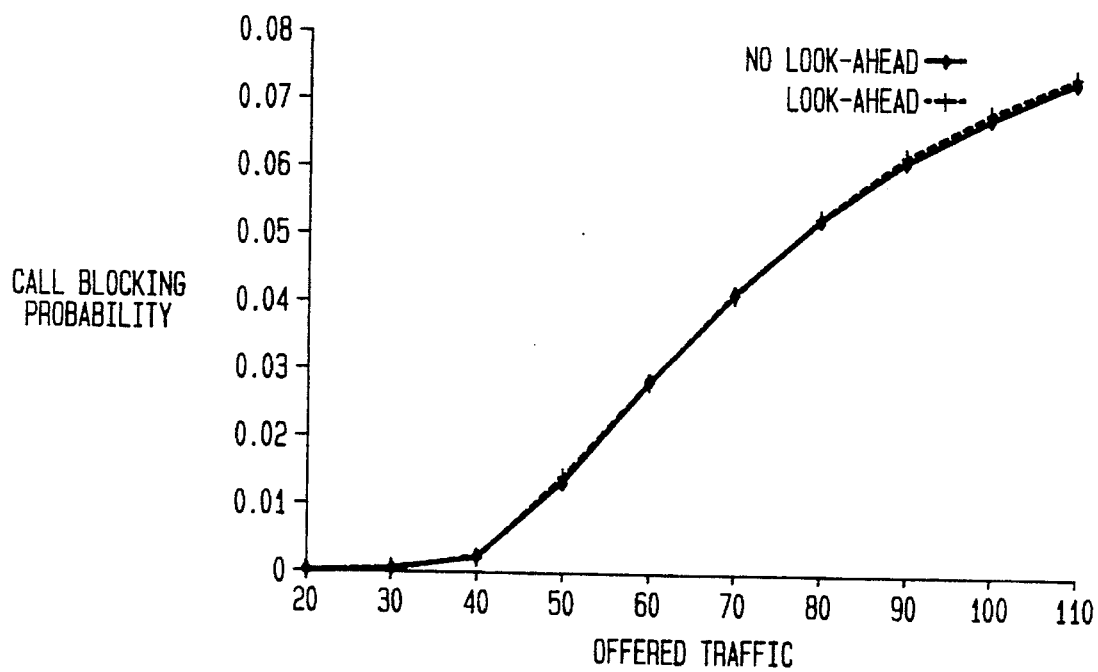
FIG. 7 is a graphical representation of offered traffic versus call blocking probability for two different channel reservation systems.
Figure 8:
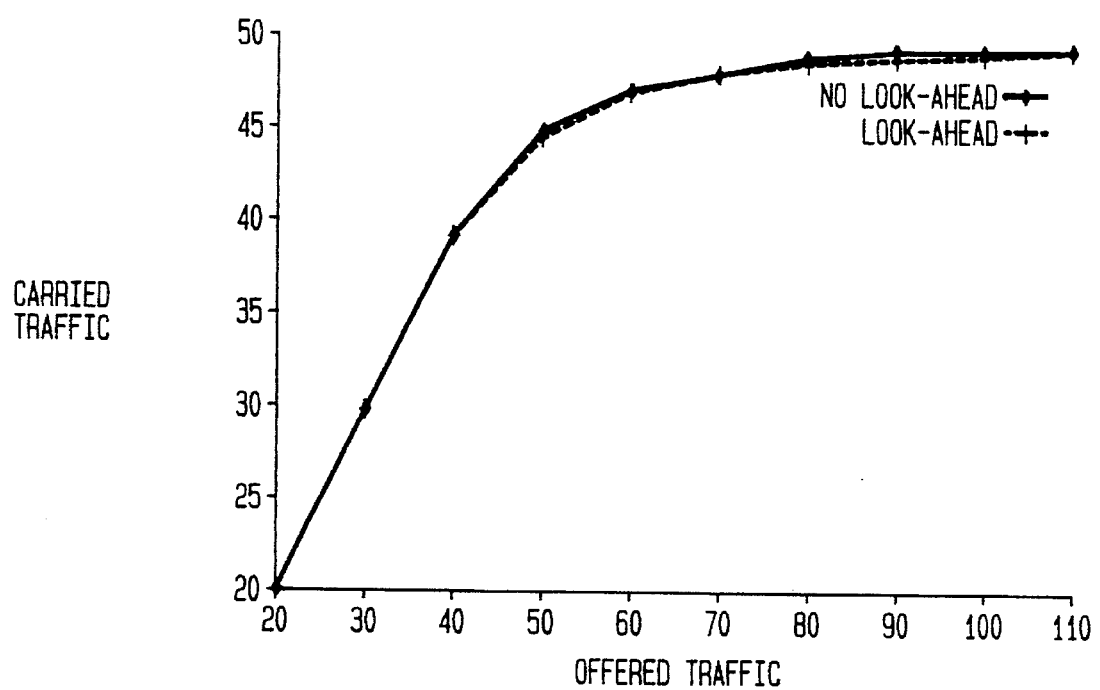
FIG. 8 is a graphical representation of offered traffic versus carried traffic for two different channel reservation systems.

The effect of the "look-ahead" channel reservation system of the subject invention on handover failure probability, call blocking probability, and overall carried traffic is represented graphically in FIGS. 6–8, respectively, as compared to a prior art "no look-ahead" channel reservation system, utilizing a model simulation. The simulation involves a single cell having an assumed capacity of fifty channels with call arrivals assuming a Poisson distribution. The power received from the base station is assumed to degrade monotonically in the handover region associated with the cell, and thus handover requests are prioritorized in dependance upon distance measurements rather than power level measurements.

The simulation was run over a range of 20 to 110 Erlangs (ratio of the arrival rate to the service rate of a single channel), and handover traffic was assumed to be 25% of the total offered traffic. The simulation also assumed that the ratio of the width $L_p$ of the pre-handover zone to the width $L_h$ of the handover region was 0.20. Referring now to FIGS. 6–8, as compared to a prior art "no look-ahead" channel reservation system, the "look ahead" channel reservation system of the subject invention, employing a pre-handover zone, effects a decrease in handover failure probability without significantly increasing call blocking probability and decreasing overall carried traffic.

Although the subject invention has been described with respect to preferred embodiments, it will be readily apparent to those having ordinary skill in the art to which it appertains that changes and modifications may be made thereto without departing from the spirit or scope of the subject invention as defined by the appended claims.

What is claimed is:

1. A method of allocating channels to mobile subscribers entering a handover region extending between the boundary of first and second adjacent cells of a cellular network, each of said cells having channels provided therein for call allocation and having a pre-handover zone defined therein proximate the handover region, said method comprising the steps of:

determining a number of mobile subscribers traversing the pre-handover zone of said first cell;

determining a number of mobile subscribers within the handover region awaiting a free channel in said second cell;

determining a number of free channels available in said second cell; and blocking a new call involving a subscriber within said second cell to reserve a channel for a subscriber traversing said pre-handover zone based on a relationship between the number of Subscribers determined to be traversing the pre-handover zone of said first cell, the number of subscribers determined to be in the handover region awaiting a free channel, and the number of channels determined to be available in said second cell.

2. A method according to claim 1, further comprising the step of queuing the channel request of a mobile subscriber entering the handover region if a channel is not available in said second cell at such a time.

3. A method according to claim 2, wherein said step of queuing the channel request of a mobile subscriber comprises ordering the channel requests of each of the mobile subscribers traveling within the handover region in dependence upon the measured power signal associated with each of said mobile subscribers.

4. A method according to claim 1, further comprising the step of granting a free channel within said second cell to a new call involving a subscriber therein provided that there are no mobile subscribers determined to be traveling within the handover region awaiting a free channel in said second cell and the number of free channels in said second cell is greater than the number of mobile subscribers traversing the pre-handover zone in said first cell.

5. A method according to claim 1, wherein said step of blocking a new call includes blocking a new call involving a subscriber of said second cell if there are determined to be zero mobile subscribers traveling within the handover region awaiting a free channel in said second cell and the number of free channels in said second cell is less than the number of mobile subscribers traversing the pre-handover zone of said first cell.

6. A method according to claim 4, further comprising the step of blocking said new call if there is at least one mobile subscriber traveling within the handover region awaiting a free channel in said second cell.

7. A method according to claim 4, wherein said cellular network further includes a plurality of other cells, and wherein said method further includes;

establishing pre-handover zones within each of said other cells proximate associated handover zones of said other cells;

determining a number of mobile subscribers traversing said pre-handover zones and said handover zones of said other cells;

blocking new calls involving subscribers of a given one of said first, second and other cells upon the occurrence of a predefined event based on the number of subscribers determined to be traversing pre-handover zones of cells adjacent said given cell, the number of subscribers within the handover zone of said given cell awaiting a free channel, and the number of free channels available in said given cell.

8. A method according to claim 1, wherein said step of determining whether a mobile subscriber is traversing the pre-handover zone comprises calculating a relative position of said mobile subscriber by measuring the power signal transmitted thereby.

9. A cellular network comprising:

a) a plurality of adjoining cells having boundaries extending therebetween and each having channels provided therein for call allocation;

b) a handover region extending across the boundary of adjacent cells wherein on-going calls of mobile subscribers are transferred from one cell to another cell;

c) a pre-handover zone defined in each of said plurality of adjoining cells proximate the handover region associated therewith;

d) means for determining a number of mobile subscribers traversing the pre-handover zones within each of said adjoining cells;

e) means for determining a number of mobile subscribers within the handover zones awaiting free channels; and f) means for blocking new calls involving subscribers of a given cell to reserve channels for subscribers traversing said pre-handover zones based upon a relationship between the number of free channels in said given cell, the number of subscribers within the handover region of said given cell, and the number of subscribers traversing the pre-handover zone of at least one adjacent cell to said given cell.

10. A cellular network as recited in claim 9, wherein each of said cells has a respective base station located therein which determines whether a mobile subscriber is traversing the pre-handover zone defined therein and communicates a relative position of the mobile subscriber to the base station in an adjacent cell.

11. A cellular network as recited in claim 9, wherein the pre-handover zone in each of said cells has a width that is less than the width of the handover region proximate thereto.

12. The cellular network according to claim 9, wherein said means for blocking new calls includes means for blocking new calls involving subscribers of said given cell if the number of subscribers within said handover region of said given cell is determined to be zero and the number of free channels within said given cell is less than the number of subscribers traversing the pre-handover zone of at least one adjacent cell to said given cell.

13. In a cellular network having a plurality of cells each defined by a respective boundary, and handover regions extending across the boundaries of adjacent cells, the improvement therewith comprising:

a pre-handover zone defined in each of said cells proximate the handover region associated therewith within which free channels are reserved in an adjacent cell for mobile subscribers traveling theretoward;

means for determining a number of mobile subscribers traversing the pre-handover zones within each of said adjacent cells;

means for determining a number of mobile subscribers within the handover zones awaiting free channels; and means for blocking new calls involving subscribers of a given cell to reserve channels for subscribers traversing said pre-handover zones based upon a relationship between the number of free channels in said given cell, the number of subscribers within a handover region of said given cell, and the number of subscribers traversing the pre-handover zone of at least one adjacent cell to said given cell.

14. The cellular network as recited in claim 13, wherein the pre-handover zone defined in each of said cells has a width that is less than the width of the handover region proximate thereto.

15. The cellular network as recited in claim 13, wherein the improvement further comprises means for queuing a channel request of a mobile subscriber entering the handover region if a channel is not available in the adjacent cell at such a time.

* * * * *